UNITED STATES PATENT OFFICE.

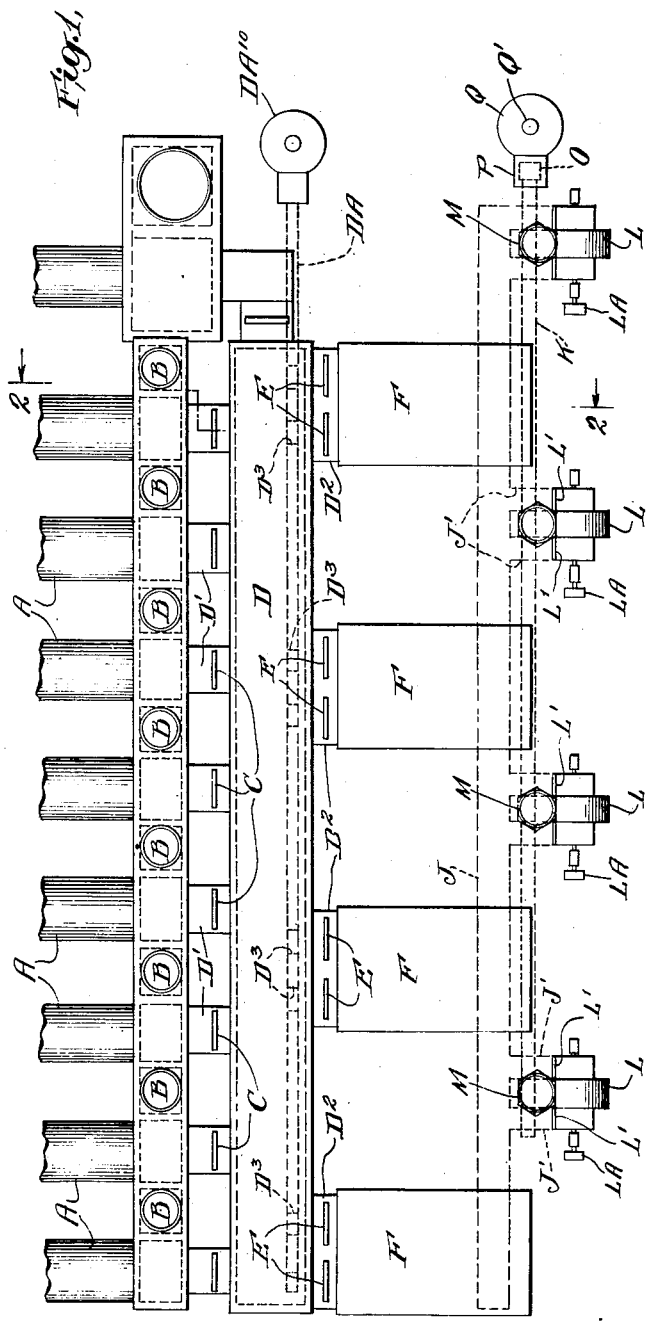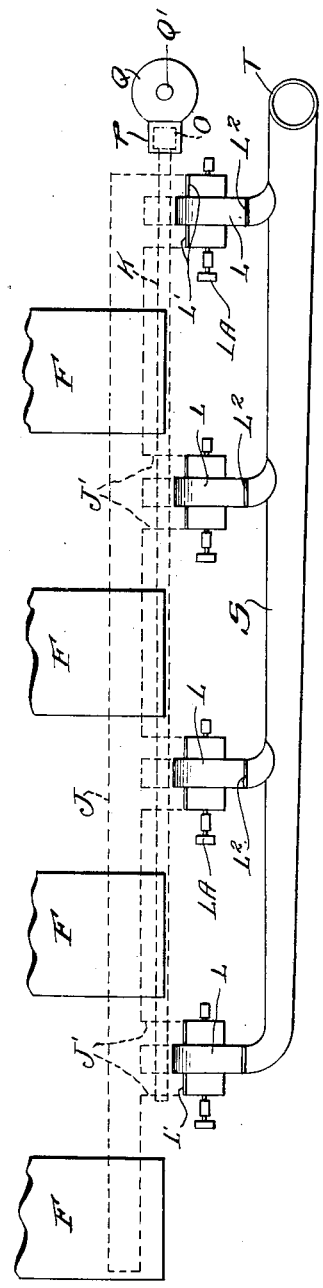

JOHN E. BELL, OF NEW YORK, N. Y.

WASTE-HEAT BOILER SYSTEM.

1,408,972.       Specification of Letters Patent.        Patented Mar. 7, 1922.

Application filed October 19, 1920. Serial No. 417,899.

*To all whom it may concern:*

Be it known that I, JOHN E. BELL, citizen of the United States, and resident of the city of New York, in the county of Kings and State of New York, have invented certain new and useful Improvements in Waste-Heat Boiler Systems, of which the following is a specification.

My present invention consists in an improved waste heat boiler system especially devised for use in connection with a cement plant comprising a plurality of kilns, to recover the available heat in the kiln gases. To make such a waste heat system commercially feasible and desirable it is obviously necessary that the waste heat apparatus should not prevent efficient operation of the cement plant itself, and that its contruction and operating costs must be low enough to permit an adequate monetary return on the waste heat plant invested since the possibility of such a return is the primary reason for the waste heat installation.

In the practical operation of such a waste heat plant it is essential that the dust laden heating gases from the cement kilns be moved through the intertube spaces of the boilers and economizers at relatively high speeds to obtain efficient heat absorption with boilers and economizers relatively small and hence inexpensive in first cost, and to avoid dust deposits on the heat absorbing surfaces of the boilers and economizers, materially reducing the boiler and economizer heat absorption capacity. The maintenance of the necessary high speed of gas flow through the boilers and economizers requires a high draft suction at the heating outlets from the boiler housings and in practice the necessary draft cannot be obtained by stack suction alone, but requires the use of exhaust fans driven by steam turbines or electric motors and consuming substantial amounts of power in their operation. The cost of the exhaust fans and their driving motors is a substantial item in the first cost of the waste heat installation, and the cost of the power required for their operation, and of the repairs necessary for their maintenance in operation are main items in the cost of operation of the waste heat plant.

Practical considerations require that a cement plant waste heat boiler installation shall ordinarily comprise a plurality of boilers and a plurality of exhausters. Heretofore it has been the practice to combine the boilers and exhausters in units so that when as frequently occurs, it became necessary to cut one exhauster out of service for cleaning, inspection or repairs, it has also been necessary to cut the boiler in the same unit out of service, or vice-versa; and the general object of the present invention is to improve a plant of the character specified by making provisions whereby the various boilers and the various exhausters each forms a separate unit which can be cut out of service while all the remaining units are left in operation. By doing this I make possible a substantial reduction in the initial cost of the plant and a substantial reduction in the cost of the plant maintenance and operation as is hereinafter fully explained.

The various features of novelty which characterize my invention are pointed out with particularity in the claim annexed to and forming a part of this specification. For a better understanding of the invention, however, and its advantages, reference should be had to the accompanying drawings and descriptive matter in which I have illustrated and described a preferred embodiment of my invention.

Of the drawings;

Fig. 1 is a diagrammatic plan view of a waste heat plant;

Fig. 3 is a diagrammatic plan view illustrating a modification of the plan shown in Fig. 1.

Figure 2:
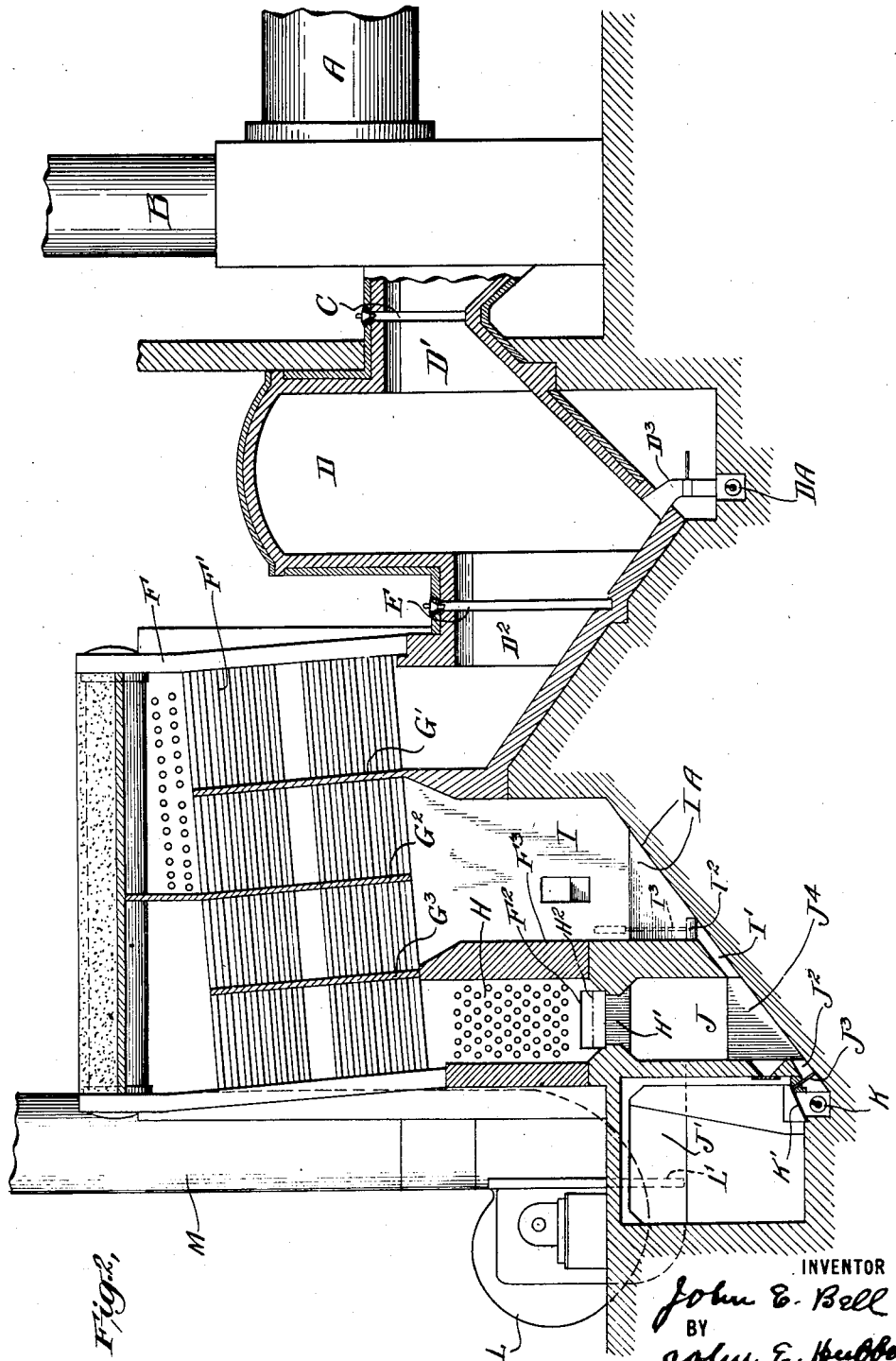
Fig. 2 is a sectional elevation taken on the line 2—2 of Fig. 1.

In the drawings, and referring first to the construction shown in Figs. 1 and 2, I have illustrated the use of my invention in a waste heat boiler system for handling the hot gases from a battery of rotary cement kilns A. Each of the kilns A normally discharges its hot gases into a common flue D, having an inlet connection D' from each of the kilns. C is the seat or guideway of a damper or valve arrangement of known type for closing off each connection D' when necessary. Associated with each kiln A in a known manner is a corresponding stack B which is normally disconnected from the kiln, but which may be connected thereto when the corresponding flue connection D' is closed to permit the operation of the kiln at that time without waste heat recovery. Associated with the flue D is a battery of waste heat boilers F of which there are four in the particular plant of ordinary capacity shown, though it is to be understood that such a plant sometimes comprises more and sometimes less than four boilers. The housing of each boiler F is connected to the flue D by an individual connection D² which may be closed when necessary by a damper or valve inserted in the guideway or valve seat E. The bottom walls of the passages D' and D² and of the flue D are sloped as shown in Fig. 2 so that deposited dust tends to pass through the outlets D³ into the screw conveyor DA located beneath and parallel to flue D.

As shown the boilers F are water tube boilers and each is provided with baffles G', G² and G³ transverse to the water tubes F', for causing the gases to traverse the inter tube space four times in passing from the boiler housing inlet D² to the outlet of the boiler housing before entering to the chamber in the boiler housing containing the economizer H which is located beneath the water tubes at the front end of the boiler.

In so far as above described the waste heat boiler system contains nothing claimed in this specification as novel with me, though it does embody features of construction and arrangement claimed in patent applications previously filed by me.

In the construction shown each economizer chamber is normally connected at its bottom through a port H' to a flue J running parallel to the flue D. A damper or valve H² is provided for closing each port H' when necessary. Each damper H² may be put into and out of place through an opening F² provided for the purpose in the side of the corresponding boiler housing. Associated with the flue J are a plurality of motor driven exhaust fans L each driven by a suitable motor LA which ordinarily is a steam turbine. Each exhauster discharges into a corresponding stack M as shown in Figs. 1 and 2, and each is shown as connected to the flue J by a corresponding pair of inlet passages J' which are normally open but may be closed when necessary or desirable by the dampers or valves L'. Ordinarily, and as shown, there are as many exhausters L as there are boilers F. Dust dropping out of the flue gases in the passes of the boiler between the baffle walls G' and G², and G² and G³, collects in pockets I having sloping bottom walls which converge to outlet passages I' controlled by dampers or valves I² which may be manipulated by operating extensions I³ extending to the exterior of the boiler housing. The passages I' open into the flue J and the latter is provided at its bottom with dust receiving pockets J⁴ open at their tops to the flue J and open at their bottoms through outlets J² into the casing of a screw conveyor K which extends parallel to the flue J and is connected at its discharge end to a dust receiver P, and damper Q. The dust handling mechanism just referred to comprises various novel characteristics and advantages which however need not be described herein, as they form no part of the present invention and are set forth and claimed in a companion application filed of even date herewith.

In the normal intended operation of the apparatus shown in Figs. 1 and 2, the passages D', D², H' and J' are all open, and each exhauster L creates the necessary draft for passing to the corresponding stack M the quantity of gases passing through a single boiler F and economizer H. Practically the work performed by each exhauster then is that required to move the proper amount of heating gases through the passages of a single boiler and economizer at the proper speed. The draft required at the outlet of the kiln proper is negligible in amount in comparision with that required to produce the necessary velocity of flow through the restricted passages of the boiler and economizer, and in practice the stacks M provide approximately the amount of draft required at the delivery ends of the kilns.

Because of the high draft required and the severe operating conditions, it is frequently necessary to cut the different boilers and exhausters out of operation for purposes of inspection, cleaning and repairs. By closing the appropriate passage D² and H'; or J⁴ in the apparatus shown in Figs. 1 and 2, any one boiler or any one exhauster may be cut out of service while the other units of the plant remain in operation. In addition to the obvious convenience and flexibility of operation of an arrangement permitting the operation of any desired number of boiler units and exhauster units at one time, there is a special advantage of prime economic importance in the capacity for rendering one boiler inoperative while all the exhausters remain in operation, and for rendering one exhauster inoperative while all the boilers remain in operation. This special advantage is made readily apparent by comparing the operating conditions when the only inoperative unit of the plant is one boiler or one exhauster, with the operating conditions when both a boiler and an exhauster are inoperative. With four boilers and four exhausters shown, the effect of cutting one exhauster out of operation at a time at which the full normal output of the cement plant and the waste heat boiler plant is maintained is simply to increase the work normally required from each of the other exhausters by 33⅓%, since each exhauster remaining in operation then passes one third more than the volume of gases passed by it with all four exhausters in operation, and the pressure differential between the stacks M and the flue J is unchanged. The effect of simultaneously cutting out of operation one boiler and one exhauster without reducing the cement kiln and boiler output is to increase the work performed by each of the three exhausters remaining in service, not $33\frac{1}{3}\%$, but about 139%, for when a boiler is cut out of operation the quantity of gases which must be moved through each of the boilers remaining in service is not only increased $\frac{1}{3}$, but the draft differential between the flues D and J must be nearly doubled. The draft differential required to move the gases through the restricted passages in the boiler housing varies in approximate proportion to the square of the velocity of flow of the gases. To increase the gas flow through the boiler by one third therefore requires the draft differential to be increased to $\frac{16}{9}$ of its normal value. The energy required for the operation of each of the three exhausters then in operation is $2\frac{10}{27}$ $\left(i.\ \frac{4}{3} \times \frac{16}{9}\right)$ times the normal energy requirement of each exhauster.

If one boiler is out of service while the other three boilers and the four exhausters continue to handle the same total amount of gases as before, it becomes necessary to increase the draft differential between the flues D and J to $\frac{16}{9}$ of its normal value, but this represents the total increase in energy required for the operation of each exhauster since the quantity of gases moved through each of the four exhausters in service remains the same as in normal operation.

While the advantage gained with the new arrangement over the prior arrangement is less marked when the unit out of service is a boiler than when the inoperative unit is an exhauster, the gain with a boiler out of service is nevertheless a substantial one, and it is to be noted that practical operating conditions ordinarily make it necessary to cut an exhauster out of service much more frequently than a boiler. The maintenance of full cement plant and boiler plant outputs with one boiler out of service requires the use of an exhauster capable of operation with a load approximately 78% in excess of the normal maximum exhauster load. While the effect of cutting out both a boiler and an exhauster is to make it necessary to provide an exhauster large enough to carry a load approximately 139% in excess of its normal full exhauster load when all boilers and exhausters are in service. The advantage of this reduction in maximum exhauster capacity required is especially important when the exhausters are driven by steam turbines as is usual, for in that case the reduction in exhauster capacity made possible by the use of the invention, not only substantially reduces the size and hence the first cost of the exhausters and the maximum steam consumption required for their operation, but substantially increases the efficiency of the plant in normal operation with all of the boilers and exhausters in service, since, as is well known to those skilled in the art, the efficiency of a turbo exhauster is markedly lower at small loads than at higher loads.

Instead of providing each motor driven exhauster L with a corresponding stack M, each exhauster L may discharge through an individual outlet into a common flue S connected to a common stack T as shown in Fig. 3. When this construction is employed, a damper or valve is provided as indicated at $L^2$, for closing communication between each exhauster and the flue S.

While in accordance with the provisions of the statutes I have illustrated and described the best form of apparatus embodying my invention now known to me, it will be apparent to those skilled in the art that changes may be made in the form of the apparatus disclosed without departing from the spirit of my invention as set forth in the appended claim and that certain features of my invention may sometimes be used to advantage without a corresponding use of other features.

Having now described my invention, what I claim as new and desire to secure by Letters Patent, is:

A waste heat boiler system for cement plants comprising, in combination, a flue receiving hot gases from a plurality of cement kilns, a second flue, a plurality of separate waste heat boilers connected between said flues, a plurality of motor driven exhausters separately connected to said second flue, and provisions for separately closing the flue connections to the various boilers and exhausters to permit any boiler or exhauster in the plant to be cut out of service while the other boilers and exhausters remain in service.

Signed at New York, in the county of New York and State of New York, this 16th day of October, A. D. 1920.

JOHN E. BELL.